United States Patent [19]

Schons

[11] 3,834,732
[45] Sept. 10, 1974

[54] TIRE SPRAY COLLECTOR APPARATUS
[76] Inventor: Pete A. Schons, 2245 S. W. Marth St., Portland, Oreg. 97201
[22] Filed: July 2, 1973
[21] Appl. No.: 375,620

[52] U.S. Cl. ................................. 280/154.5 R
[51] Int. Cl. ............................................. B62b 9/16
[58] Field of Search ........................ 280/154.5 R

[56] References Cited
UNITED STATES PATENTS
3,088,751  5/1963  Barry et al. ................... 280/154.5 R
3,341,222  9/1967  Roberts .......................... 280/154.5 R Primary Examiner—Robert B. Reeves
Assistant Examiner—Joseph J. Rolla
Attorney, Agent, or Firm—Klarquist, Sparkman, Campbell, Leigh, Hall & Whinston

[57] ABSTRACT

A tire spray collector apparatus for reducing the water spray at the side of a vehicle is described, including a shield member and an apertured collector member positioned below such shield member and above the tires of a truck, automobile or other wheeled vehicle. The collector member and shield member are attached together to form a closed spray collecting chamber that is sealed around the entire periphery of such members. As a result, water spray from the tires enters the chamber through the openings in the collector member and is prevented from leaving the chamber, except through drains provided at the opposite ends of the spray collector apparatus. Flexible hoses are connected to these drains and have their outlet ends positioned adjacent the ground to discharge the drain water inwardly of the wheels to prevent such drain water from producing further tire spray. In one embodiment, the collector member is in the form of a corrugated sheet having a plurality of upward opening longitudinal channels separated by longitudinal ridges which have a plurality of openings provided in the tops of such ridges so that water spray enters the collector chamber through said openings, is reflected from the shield member and flows along the bottoms of the channels to the discharge hoses. The tire spray collector apparatus does not extend over the side of the tires, so that it does not cause overheating of such tires, and also enables easy removal of the tires and installation of tire chains.

12 Claims, 10 Drawing Figures

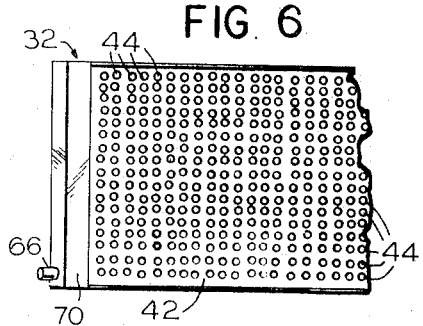
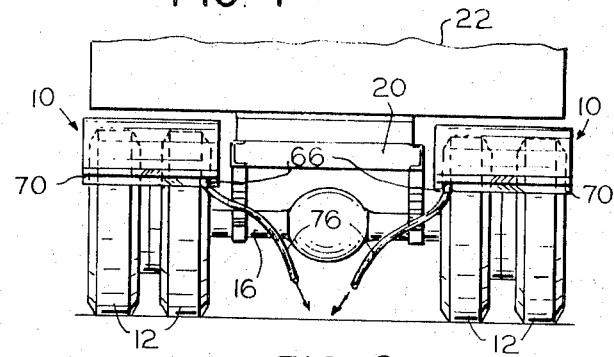
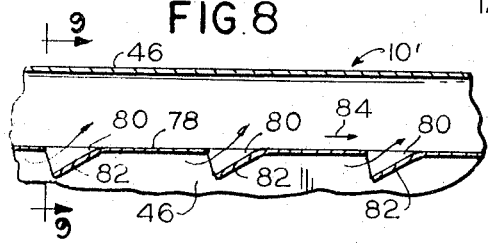
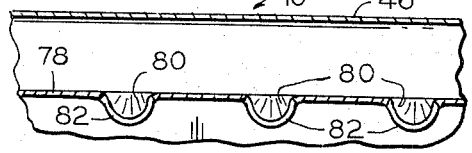
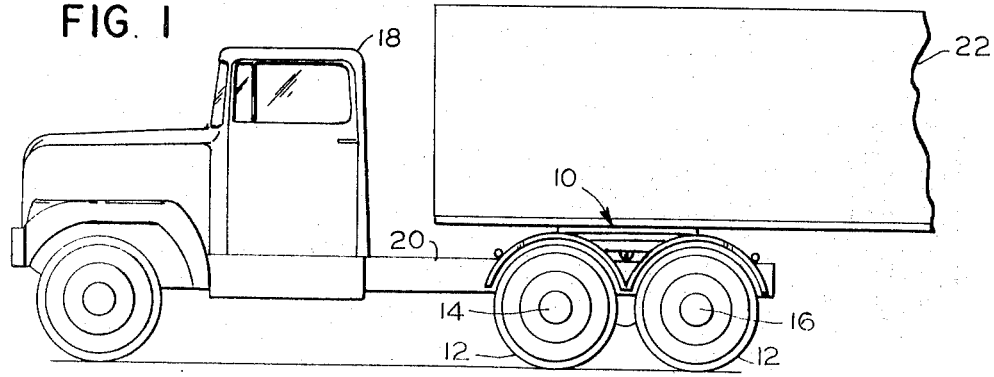
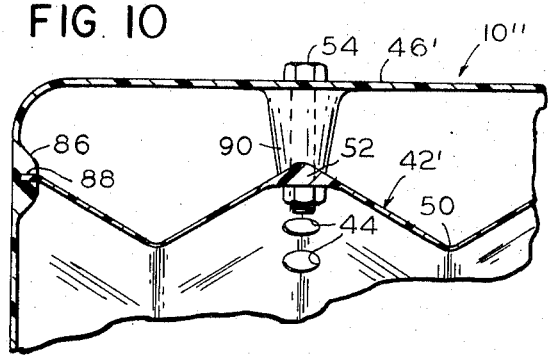

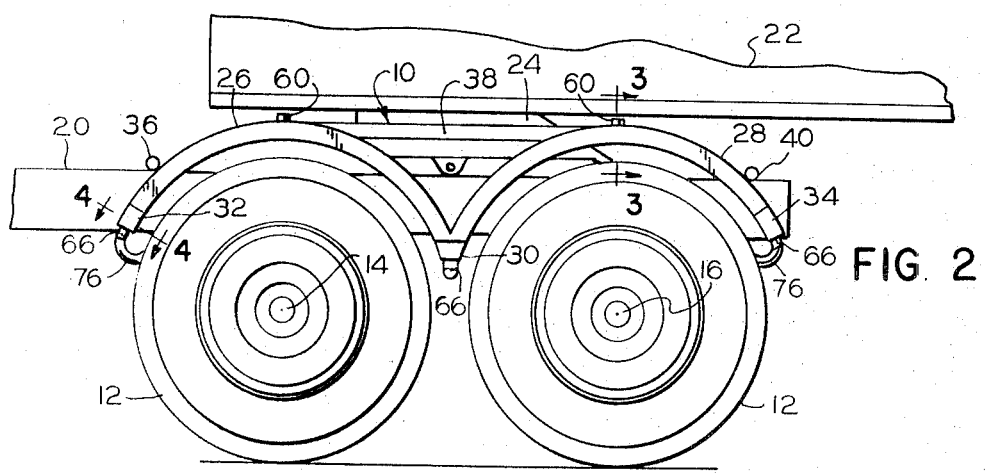
FIG. 2
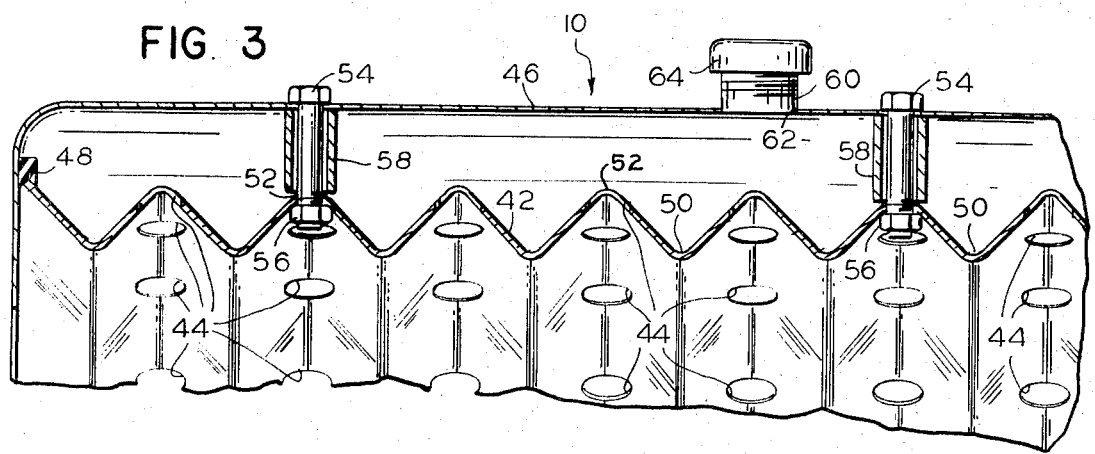
FIG. 3
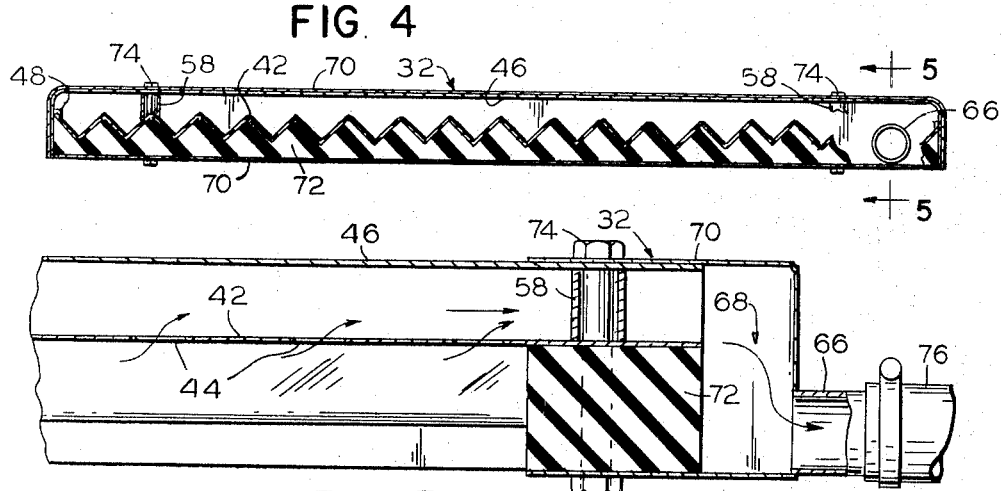
FIG. 4
FIG. 5

TIRE SPRAY COLLECTOR APPARATUS

BACKGROUND OF THE INVENTION

The subject matter of the present invention relates generally to tire spray inhibiting apparatus for reducing water spray at the sides of wheeled vehicles, such as trucks, when they travel at high speed along a road having water thereon. This tire spray problem is particularly dangerous with respect to trucks, since the drivers of automobiles passing, or being passed by, such trucks are frequently blinded by the spray for a relatively long time, even though their windshield wipers are operating. The tire spray collector apparatus of the present invention solves this problem by greatly reducing the tire spray emitted to the side of the vehicle and confining such side spray to the lower portion of the wheel. This is achieved by transmitting the spray into a collecting chamber through a plurality of openings in a collector member which is attached to an upper shield member to form such chamber in a manner so that the chamber is closed along the entire periphery of such members to prevent water from leaving the chamber between such members. A drain means is provided at opposite ends of the spray collecting chamber and connected to a flexible hose for discharging the drain water to the ground at a position inwardly of the tires to prevent such drain water from producing additional spray. In addition, the spray collector apparatus includes a mounting means for mounting the collector member and the shield member on the vehicle body so that they are spaced above the periphery of the tire and do not overlap the side of such tire which prevents the tire and brakes from overheating and causing tire blowouts and brake failure. In addition, this enables easier tire replacement and installation of tire chains without removal of the collector apparatus.

Previously it was suggested, in U.S. Pat. No. 3,341,222 of F. D. Roberts, granted Sept. 12, 1967, to provide an apertured spray collector member beneath the fender of an automobile so that the tire spray passed through the apertures in such collector member and was deflected by the fender into drain channels on the upper side of the collector member. However, this prior apparatus has several disadvantages and does not reduce tire spray significantly because the apertured collector member does not form a closed collecting chamber with the fender since it was not sealed to the fender around the entire periphery of such collector member. As a result, tire spray is re-emitted from the space between the collector member and the fender, due to the air turbulence in such space. In addition, this prior apparatus discharged the drain water from the apertured collector member at a point adjacent the outside of the wheels where it was again picked up by the air turbulence adjacent such wheels to create additional spray. Both of these defects are cured by the tire spray collector apparatus of the present invention. In addition, this prior apparatus employs fenders as the shield member of the tire spray collector, and since such fenders extend down over the sides of the tire wuld cause undue heating of truck tires and brakes which can cause tire blowouts and brake failure.

It is, therefore, one object of the present invention to provide an improved tire spray collector apparatus which reduces the water spray from the tires of wheeled vehicles in a simple, inexpensive and effective manner.

Another object of the invention is to provide such a tire spray collector apparatus in which a spray collecting chamber is formed between an apertured collector member and a shield member attached thereto so that such chamber is closed along the entire periphery of such members sufficiently to prevent water from leaving the chamber between such members.

A further object of the invention is to provide such a tire spray collector apparatus in which the water spray collected in the chamber is drained therefrom and discharged at a position inwardly of the tires and close to the ground to prevent such water from producing additional spray.

An additional object of the invention is to provide such a tire spray collector apparatus in which the collector member and shield member are mounted on the vehicle body at a position spaced above the periphery of the tire so that they do not overlap the side of the tire in order to prevent undue heating of the tires and brakes and to enable easier replacement of tires and installation of tire changes.

Still another object of the invention is to provide such a tire spray collector apparatus which includes means for cleaning the spray collecting chamber by directing a pressurized stream of water into such chamber.

A still further object of the invention is to provide such a tire spray collector apparatus in which the collector member is provided with drains on its upper surface to transmit the spray water to the discharge means, and is provided with means for preventing the spray water from leaving the collecting chamber through the spray inlet openings in such collector member.

BRIEF DESCRIPTION OF THE DRAWINGS

Other objects and advantages of the present invention will be apparent from the following detailed description of certain preferred embodiments thereof and from the attached drawings of which:

FIG. 1 is a side elevation view of a truck employing the tire spray collector apparatus of the present invention;

FIG. 2 is an enlarged view of the tire spray collector apparatus of FIG. 1 in position over dual truck tires on two adjacent axles;

FIG. 3 is a partial vertical section view on an enlarged scale taken along the line 3—3 of FIG. 2 and showing the interior of the spray collector apparatus;

FIG. 4 is a section view taken along the line 4—4 of FIG. 2 showing the discharge means provided at the ends of the collector apparatus;

FIG. 5 is an enlarged vertical section view taken along the line 5—5 of FIG. 4;

FIG. 6 is an elevation view of the bottom of one end of the tire spray collector apparatus of FIG. 2;

FIG. 7 is an elevation view looking at the rear of the truck of FIG. 1 and showing the position of the discharge hoses of the spray collector means;

FIG. 8 is a longitudinal section view of another embodiment of the tire spray collector apparatus of the present invention;

FIG. 9 is a vertical section view taken along the line 9—9 of FIG. 8; and

FIG. 10 is a section view similar to that of FIG. 3 showing a third embodiment of the tire spray collector apparatus of the present invention.

DESCRIPTION OF PREFERRED EMBODIMENTS

As shown in FIGS. 1 and 2, a tire spray collector apparatus 10 in accordance with one embodiment of the present invention may be employed over the tires 12 on dual wheels attached to two adjacent axles 14 and 16. The collector apparatus 10 may be provided over the rear wheels of a truck tractor including a cab 18 and a frame 20, and they may also be provided over the wheels on a truck trailer 22 attached to the truck tractor by a conventional "fifth" wheel connection 24.

The spray collector apparatus 10 includes a first arcuate portion 26 positioned over the dual wheels on the first axle 14, and a second arcuate portion 28 over the dual wheels on the second axle 16. These first and second collector portions extend downward between the two pairs of wheels and are joined together at a common drain discharge portion 30. Another pair of drain discharge means 32 and 34 are provided at the other ends of the first and second arcuate portions 26 and 28, respectively, of the spray collector apparatus. The spray collector apparatus 10 is attached to the truck frame 20 by support members 36 and 40 which may be in the form of steel rods or pipe attached at one end to the frame and at the other end to the top of a collector apparatus. A reinforcing plate 38 may be attached between the tops of the first and second arcuate portions 26 and 28 for more support.

As shown in FIG. 3, the collector apparatus 10 includes an apertured collector member 42 having a plurality of openings 44 therethrough which enable the water spray to enter the collector apparatus 10 through such openings. An unapertured shield member 46 of U-shaped cross section is positioned above the collector member 42 to form a spray collecting chamber which is closed around the entire periphery of members 42 and 44 by any suitable closure means, including a pair of rubber gasket seal members 48. The seal members may be glued, riveted or otherwise fastened to the two side portions of the shield member 46 and are engaged by the outer end of the collector member 42. The collector member 42 may be in the form of a corrugated sheet of metal, such as aluminum which is rust and corrosion resistant.

In the embodiment of FIGS. 3 to 6, a plurality of upward opening longitudinal channels 50 are formed in the upper surface of the collector member 42 whose outwardly sloping sides meet to form longitudinal ridges 52 between adjacent channels. The collector openings 44 are formed in the tops of such ridges 52 so that water spray entering such openings strikes the shield member 46 and is deflected down into the channels 50, which act as drains to carry the water to the drain discharge means 30, 32 and 34. It should be noted that since the collector openings 44 are positioned above the bottom of the channels 50, the spray water runs by gravity down the sides of the channels away from such openings and this prevents the water from leaving the spray collection chamber and returning to the tires through such openings.

The collector member 52 is attached to the shield member 46 by means of bolts 54 and nuts 56. A spacer sleeve 58 is provided around the bolt between the shield member and the collector member in order to space them apart a distance of approximately ¾ inch. The collector member 14 may have a thickness of about 1½ inches from the top of the ridge 52 to the bottom of the channel 50. A threaded hose connector 60 is attached over an opening 62 in the top of the shield member 40 to enable the spray collector apparatus to be washed out by a stream of high pressure water supplied by a hose attached to such connector. When not in use, the hose connector 60 is closed by a threaded cap member 64. It may be necessary to employ more than one hose connector for each arcuate section 26, 28 of the spray collector apparatus depending upon the width of such apparatus.

As shown in FIGS. 4 and 5, each of the drain discharge means 30, 32 and 34 includes a discharge pipe 66 which communicates with a discharge chamber 68 within the collector apparatus formed between a cover member 70 and the ends of the shield member 46 and the collector member 42, through an opening in such cover member. The cover member 70 is in the form of a rectangular box having an open top which slips over the ends of the shield member 46 and the collector member 42. A resilient seal member 72 of rubber or suitable material is provided between the bottom side of the cover member 70 and the lower surface of the collector member 42 in order to provide a seal means 70 and 72 which seals the ends of the collector member and the shield member together to provide a closed collecting chamber so that water cannot pass out of the collecting chamber between such members except through the discharge pipe 66. A plurality of bolts 74 may be employed to attach the cover member 70 to the shield member 46 and the collector member 42, and to squeeze the seal member 72 so that it is clamped in position to provide a water tight seal.

As shown in FIG. 7, each of the discharge pipes 66 of the discharge means 30, 32 and 34 is connected to a flexible tube or hose 76 whose outlet end is supported inwardly of the tires 12 over which the collector apparatus 10 is mounted to prevent the drain water from being discharged in the path of the tires which would create more tire spray. The outlet ends of hoses 76 are positioned closely adjacent to the ground to prevent the water discharging onto such ground from creating further spray.

As shown in FIGS. 8 and 9, another embodiment 10' of the tire spray collector apparatus of the present invention is similar to that of embodiment 10 described previously except that the apertured collector member 78 is in the form of a flat sheet of metal having a plurality of openings 80 therethrough to enable water spray to enter a closed collecting chamber formed between the collector member and the shield member 46. A plurality of flaps 82 extend downwardly from the openings 80 formed by stamping to provide small "scoops" which face toward the rear of the tire so that the tire spray from off the tires is directed by such scoop into the spray collecting chamber. It should be noted that the water within the collecting chamber flows forwardly in the direction of arrow 84, due to the centrifugal force with which the water particles are thrown off the tire. Thus, the flaps 82 prevent the spray water from flowing back out of the collector chamber through openings 80.

A third embodiment 10" of the spray collector apparatus of the present invention is shown in FIG. 10, which is similar to the apparatus of FIG. 3, except that the collector member 42' and shield member 46' are molded of plastic material or plastic reinforced fiberglass. An inner ridge projection 86 is molded into each side of the shield member 46' and provided with a longitudinal notch 86 into which the edge of collector member 42' slides to provide a closure means between these members to form the closed spray collecting chamber. In addition, spacer projections 90 can be molded into the top surface of the shield member 46' in positions to surround the bolts 54, rather than using the spacer sleeves 58. In this embodiment, as well as the other embodiments previously discussed, the collector member 42' can be replaced when it is damaged, such as due to rocks thrown from the tires and any other cause.

It will be obvious to those having ordinary skill in the art that many changes may be made in the details of the above-described preferred embodiments of the present invention without departing from the spirit of the invention. Therefore, the scope of the present invention should only be determined by the following claims.

I claim:

1. Tire spray collector apparatus in which the improvement comprises:
    a collector member adapted to be mounted over a tire on a wheeled vehicle and having a plurality of openings which enable water spray from said tire to pass through said collector member;
    a shield member provided on the opposite side of said collector member from said tire so that water spray passing through said openings in said collector member strikes said shield member; and
    closure means for attaching said shield member to said collector member to form a spray collecting chamber which is closed along the entire periphery of said members including their ends, sufficiently to prevent water particles from leaving said chamber between said member.

2. Collector apparatus in accordance with claim 1 which also has drain means for draining the water from said chamber.

3. Collector apparatus in accordance with claim 2 in which the drain means includes discharge means for discharging the drain water to the ground at a position inward of said tire.

4. Collector apparatus in accordance with claim 3 in which the discharge means includes a flexible tube connected at its input end to a drain member sealing one end of said collector member to one end of said shield member.

5. Collector apparatus in accordance with claim 2 in which the drain means includes channel means provided on said collector member below said openings for collecting and transmitting the water to drain members at the opposite ends of said collector member.

6. Collector apparatus in accordance with claim 5 in which the channel means includes a plurality of longitudinal channels extending longitudinally along said collector member and a plurality of longitudinal ridges extending longitudinally between said channels and having said openings provided in rows at the tops of said ridges.

7. Collector apparatus in accordance with claim 1 which also includes cleaning means for directing a pressurized stream of water into said chamber through an inlet aperture in said shield member.

8. Collector apparatus in accordance with claim 1 in which the closure means includes spacer means for causing the collector member to be substantially uniformly spaced from said shield member along its entire length.

9. Collector apparatus in accordance with claim 1 which includes mounting means for mounting the collector member and the shield member on a vehicle body so that they are spaced above the periphery of the tire and do not extend down over the side of such tire.

10. Collector apparatus in accordance with claim 9 in which the collector member and shield member extend over two pairs of tires, said pairs of tires being mounted on different axles and longitudinally spaced from each other, and a deflector member extends downward over the space between said two pair of tires.

11. Collector apparatus in accordance with claim 1 in which the closure means includes a resilient seal member between said collector member and said shield member.

12. Tire spray collector apparatus for collecting water spray from the tires of a wheeled vehicle, comprising:
    an elongated collector portion extending longitudinally of said vehicle over said tire and provided with a plurality of openings through which said spray can pass, said collector portion having means to restrict return of the spray water to the tire through said openings;
    a shield portion positioned above and spaced from said collection portion for stopping spray passing through said openings;
    closure means for securing said collector and shield portions together to provide a spray collecting chamber which is closed along the entire periphery of said collector portion including the ends of said collector portion;
    conduit means connected to said chamber for delivering collected water from said chamber to a position inwardly of the tires of said vehicle and discharging it on the ground out of the path of travel of said tires; and
    mounting means for mounting the collector apparatus on the vehicle so that the collector portion and the shield portion are spaced above the periphery of the tire and do not extend down over the side of said tire.

* * * * *